(No Model.) 2 Sheets—Sheet 1.
S. SLOAN.
DEVICE FOR CONVERTING MOTION.
No. 438,647. Patented Oct. 21, 1890.
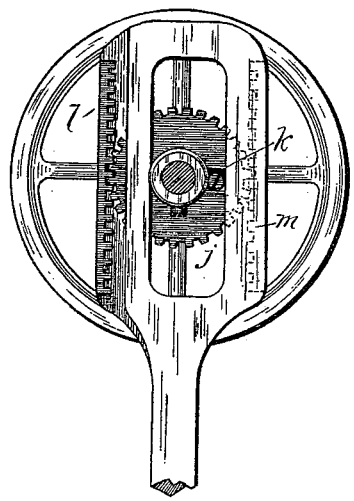
Fig. 1
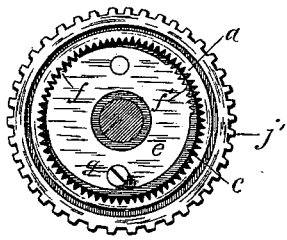
Fig. 2
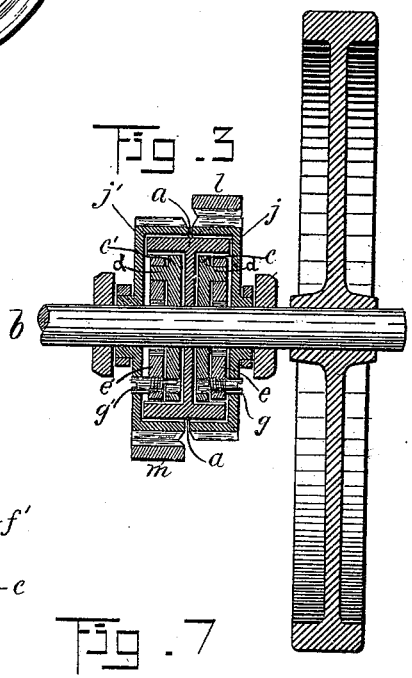
Fig. 3
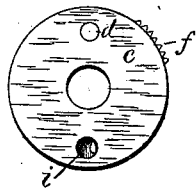
Fig. 5
Fig. 4
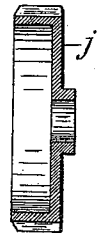
Fig. 7
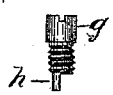
Fig. 6
Witnesses
H. J. Farwell
C. E. Schafer
Inventor
S. Sloan
W. H. Burridge
Atty.
THE NORRIS PETERS CO., PHOTO-LITHO., WASHINGTON, D. C.

(No Model.) 2 Sheets—Sheet 2.

S. SLOAN.
DEVICE FOR CONVERTING MOTION.

No. 438,647. Patented Oct. 21, 1890.

Witnesses
H. J. Farwell
C. E. Schafer

Inventor
S. Sloan
W. H. Burridge
Atty.

UNITED STATES PATENT OFFICE.

SEXTUS SLOAN, OF PAINESVILLE, OHIO.

DEVICE FOR CONVERTING MOTION.

SPECIFICATION forming part of Letters Patent No. 438,647, dated October 21, 1890.

Application filed March 29, 1890. Serial No. 345,859. (No model.)

*To all whom it may concern:*

Be it known that I, SEXTUS SLOAN, a citizen of the United States, residing at Painesville, in the county of Lake and State of Ohio, have invented certain new and useful Improvements in Devices for Converting Motion; and I do hereby declare that the following is a full, clear, and complete description thereof.

The nature of my invention relates to mechanism to be substituted in place of the crank on sewing-machines or any other kind of machinery, whereby power is communicated during the entire revolution, thereby overcoming the dead-center of the stroke.

That the invention may be seen and fully understood by others, reference is had to the following specification and annexed drawings, in which—

Figure 9:
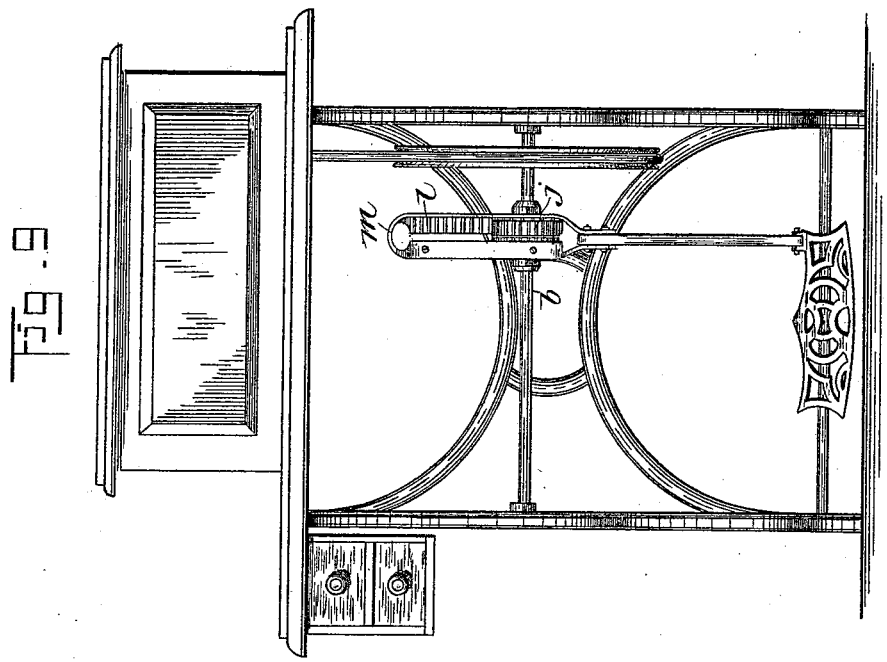
Figure 8:
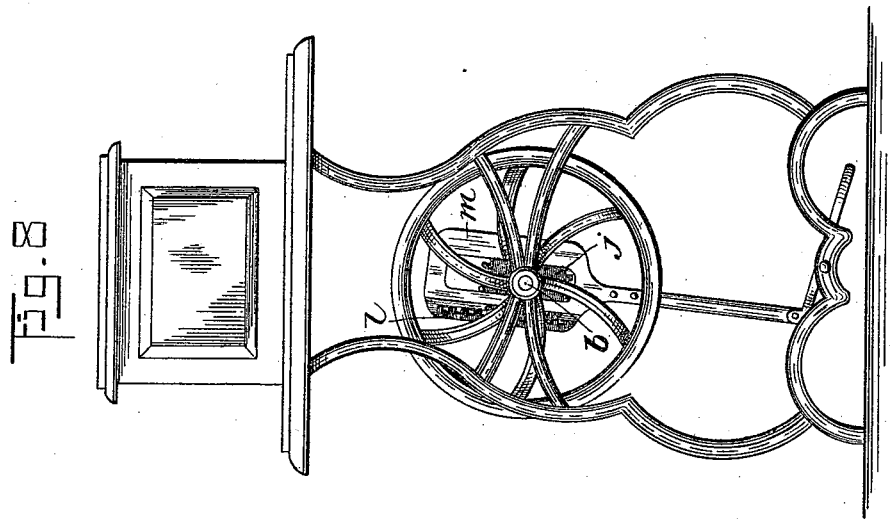

Figure 1 is a view of my invention applied to a rotatable shaft. Fig. 2 is an enlarged detached section or interior view showing several of the parts. Fig. 3 is a cross-section of my invention applied to a rotatable shaft. Figs. 4, 5, 6, and 7 are views of detached parts of the improved devices. The construction and function of each are fully described hereinafter. Figs. 8 and 9 show the application of the invention to a sewing-machine as an illustration of its operation.

Like letters of reference designate like parts throughout the specification and drawings.

Rigidly attached to the shaft $b$ by means of a key or any known device is a wheel $a$, (best shown in Fig. 3,) the rim of said wheel extending on each side, as shown in Fig. 3, and having the inner side thereof serrated or toothed, as shown in Fig. 2. The rim of the wheel $a$, extending on each side, as above mentioned, forms two chambers. In each of these chambers, in contact with the wheel $a$ and fitted loosely on the shaft $b$, are the disks $c$ and $c'$, Figs. 2, 3, 4, and 5. Pivoted to these disks $c$ and $c'$ at the points $d$ (best shown in the detail views, Figs. 4 and 5) are two other disks $e$ and $e'$ of less diameter than the disks $c$ and $c'$. A section of the periphery of the disks $e$ and $e'$ on each side of the pivot $d$ is serrated, as shown at $f\,f'$, Fig. 4. Passing through and threaded into the disks $e$ and $e'$ in a line with the pivots $d$ and the center of said disks are two screws $g$ and $g'$, of the form substantially as shown in Fig. 6, having pins $h\,h$ attached to their lower terminals. Said pins are preferably an integral part of the screws. In the disks $c$ and $c'$ are holes, one of which is shown at $i$, Fig. 5. Said holes $i$ are so placed in the disks $c$ and $c'$ as to admit the pins $h$ of the screws $g$ and $g'$.

In the center of each disk $e$ and $e'$ is a hole $n$, which circumscribes the shaft $b$, but they do not come in contact therewith. Fitted loosely on the shaft $b$ are the geared wheels or pinions $j$ and $j'$, Figs. 1, 2, 3, and 7. Said pinions incase the two chambers and the disks therein and are provided with holes, one of which is shown at $k$, Fig. 1, to admit the heads of the screws $g$ and $g'$.

A frame is attached to the connecting-rod, or it may be a part of any device where it is desired to produce a reciprocating motion. Said frame contains two racks $l$ and $m$, Fig. 1. ($m$ is shown by dotted lines.) Said racks are so arranged that the rack $l$ will be in position to engage the teeth of the pinion $j$, and the rack $m$ will be in position to engage the teeth of the pinion $j'$. These double racks may be made of any suitable material, steel or iron being preferable. The disks $e$ and $e'$ being pivoted to the disks $c$ and $c'$ at $d$ and having the screws $g$ and $g'$ passing through the disks $e$ and $e'$, and the pins $h$ entering the holes $i$ in the disks $c$ and $c'$, form two eccentrics of the disks $e$ and $e'$. When the screw $g$ is turned as shown in Fig. 6, with the pin $h$ to the left, the eccentricity of the disk $e$ causes the teeth $f'$ to engage with the teeth in the rim of the wheel $a$, which is rigid on the shaft $b$ when the pin $h$ comes in contact with the right side of the hole $i$; but when it comes in contact with the left side of the hole $i$ the two disks $e$ and $c$ have a common center, and the teeth $f$ and $f'$ are within the periphery of the disk $c$, and the two disks will revolve loosely on the shaft $b$. If the screw $g$ be turned with the pin $h$ on the right, it will be seen that the result will be the reverse of that above described for the same reason. The pinions $j$ and $j'$, being loose on the shaft and having the heads of the screws $g$ and $g'$ protruding through holes $k$ therein, will, if turned to right or left, cause the pins $h$ to come in contact with the right or left side of the holes $i$ in the disks $c$ and $c'$, thereby engaging and disengaging the teeth $f$ and $f'$ with the teeth on the inner side of the rim of the wheel $a$.

As hereinbefore stated, the wheel $a$ is rigidly secured to the shaft $b$. Therefore the teeth $f$ or $f'$, becoming engaged with the teeth of said wheel $a$, will cause the shaft $b$ and the pinions $j$ and $j'$ to revolve together, resultant from the screws $g$ and $g'$ protruding through the holes $i$. To cause the shaft $b$ to revolve in the same direction on one movement of the rack-frame as it does on the reverse movement, the screw $g$, Fig. 3, is turned so that the teeth $f$ of the disk $e'$ will engage with the teeth of the wheel $a$, while the opposite screw, or the screw $g'$, is turned so that the teeth $f''$ of the disk $e$ will engage with the teeth of the wheel $a$. Consequently when one pinion, as $j$, is revolving loosely on the shaft the other pinion $j'$ is engaged, and vice versa. One pinion is engaged on the stroke in one direction. The opposite pinion is engaged on the reverse stroke, thereby causing the shaft $b$ to revolve continually in the same direction.

In Figs. 8 and 9 I have shown the application of the device to the sewing-machine. I have taken this only as an illustration, as the device can be applied in any case where a reciprocating rod or piston is desired.

By having this device attached to a sewing-machine the operator is not required to use either hand to start the machine. There being no dead-center to overcome, the foot being applied to the treadle is sufficient to start or stop the machine with ease at any point desired. Two wheels with extending rims placed in juxtaposition to each other may be used in place of the wheel $a$ and still adhere to the nature of my invention.

What I claim, and desire to secure by Letters Patent, is—

1. In a device for converting motion, a wheel rigidly attached to a shaft, said wheel having its rim extending on each side and serrated on the interior of said extensions, in combination with two eccentric disks having their peripheries partially serrated and situated within the two chambers formed by said extensions, two pinions or geared wheels, screws the heads of which extend through holes in said pinions and the other ends terminating in a pin which is inserted in a hole in a disk to which the eccentric disk is pivoted, and two racks arranged within a frame and with which said pinions intermesh, operating in the manner and for the purpose substantially as set forth.

2. In a device for converting motion, the combination, with two eccentric disks, of the geared wheels or pinions, screws threaded into and through the eccentric disks in line with the pivot and center of said disks, the heads of said screws protruding through holes in said pinions, the opposite terminals being pins which are inserted in holes in the disks to which the eccentric disks are pivoted, and two racks arranged within a frame, whereby the engagement and disengagement of the serrated sections of said eccentric disks with the serrated inner side of the rim of the rigid disk is caused, substantially in the manner and for the purpose specified.

3. In a device for converting motion, the combination of the disks $c$ and $c'$, fitted loosely on the shaft, and the disks $e$ and $e'$, having their peripheries partially serrated, pivoted to the disks $c$ and $c'$, and operating independently of the shaft, the screws $g$ and $g'$, the pinions $j$ and $j'$, and two racks arranged within a frame, substantially in the manner and for the purpose set forth.

4. Two geared racks secured together in a frame in combination with the two pinions $j$ and $j'$, the screws $g$ and $g'$, the eccentric disks $e$ and $e'$, and the wheel $a$, whereby a rotary motion is produced, in the manner substantially as specified.

In testimony whereof I affix my signature in presence of two witnesses.

SEXTUS SLOAN.

Witnesses:
W. H. BURRIDGE,
L. F. GRISWOLD.